United States Patent [19]

Toda et al.

[11] 4,434,481

[45] Feb. 28, 1984

[54] TRAVELING WAVE SURFACE ACOUSTIC WAVE TRANSDUCER

[75] Inventors: Minoru Toda, Princeton Junction, N.J.; Eiji Shima, Hachioji, Japan

[73] Assignee: RCA Corporation, New York, N.Y.

[21] Appl. No.: 397,936

[22] Filed: Jul. 13, 1982

[51] Int. Cl.³ .................. G11B 3/00; H04R 17/04
[52] U.S. Cl. .................. 369/132; 369/135; 369/130; 310/313 R; 310/334
[58] Field of Search ............ 369/130, 131, 132, 135, 369/137, 173; 310/313 R, 334

[56] References Cited

U.S. PATENT DOCUMENTS

| | | | |
|---|---|---|---|
| 3,842,194 | 10/1974 | Clemens | 178/6.6 A |
| 4,035,590 | 7/1977 | Halter | 179/100.41 |
| 4,281,407 | 7/1981 | Tosima | 369/130 |

OTHER PUBLICATIONS

*Journal Article*— "Excitation of Elastic Surface Waves with Wideband Frequency Characteristics", (Shibayama et al.).

*Primary Examiner*—Aristotelis M. Psitos
*Attorney, Agent, or Firm*—E. M. Whitacre; W. H. Meise; J. E. Roehling

[57] ABSTRACT

A multi-electrode array deposited on a piezoelectric substrate is driven by a traveling-wave voltage generated from a wave delay generating device, such as a tapped coaxial cable. Suitably delayed and phased voltages are fed to each electrode in the array. Surface acoustic waves are excited on the surface of the piezoelectric substrate. The surface acoustic waves travel through the array in proper phase with the exciting signal supplied to the electrodes. The surface acoustic waves pick up energy as they travel along the surface. Such a structure has a number of advantages over the prior art conventional interdigital transducers. For example, they exhibit broad bandwidth characteristics, have high conversion efficiency and are generally free of spurious signals. These advantages make them well suited for application to video disc cutterheads.

25 Claims, 10 Drawing Figures

TRAVELING WAVE SURFACE ACOUSTIC WAVE TRANSDUCER

The present invention relates generally to surface acoustic wave devices and, more particularly, to surface acoustic wave devices having traveling wave surface acoustic wave transducers for use in recording high density information on a record medium.

In U.S. Pat. No. 3,842,194, issued to J. K. Clemens, video disc playback systems of a variable capacitance form are disclosed. In one configuration of the Clemens system, information representative of recorded picture and sound is encoded in the form of a relief pattern in a relatively fine spiral groove on a surface of a disc record. During playback, a stylus engages the spiral groove. Capacitive variations between a conductive electrode on the stylus and a conductive property of the disc record are sensed to recover the prerecorded information.

In accordance with the Clemens format the method of recording the prerecorded information may be effected by causing a stylus (e.g., of diamond) having a triangular shape, responsive to a combined video and audio signal, to cut relatively short geometric variations, representative of the time variations of the signal, on a surface of a master substrate. After the recording operation the surface of the master substrate has a relief pattern corresponding to that which will apear in the final disc record.

In one embodiment for recording in accordance with the Clemens format an encoded video signal is additively combined with the accompanying encoded audio signal. In accordance with this method, the accompanying encoded audio signal is obtained by causing the audio signal to frequency modulate a low frequency sound carrier over a low frequency deviation range (illustratively, 716±50 KHz). The encoded video signal is obtained from a picture modulator, wherein the composite color video signal (including luminance signals occupying a given band of frequencies and chrominance signals appearing as sideband components of a modulated chrominance subcarrier interleaved with the luminance signal components in an intermediate region of the given band) is caused to frequency modulate a high frequency picture carrier over a high frequency deviation range (illustratively, 4.3–6.3 MHz). The peak-to-peak amplitude of the sound modulator output is held at a level which is small relative to the peak-to-peak amplitude level of the picture modulator output, with an illustrative level ratio being 1:10. The respective modulated carriers are combined in a linear adder and applied to a recorder which is used to record the composite signal as geometric variations (i.e., undulations) on the master substrate.

Recently, it has been demonstrated that video disc type records may be mastered using a stylus structure wherein surface acoustic waves effect the cutting action of the stylus tip. In U.S. Pat. No. 4,281,407, issued to S. Tosima on July 28, 1981, entitled "SURFACE ACOUSTIC WAVE PICK-UP AND RECORDING DEVICE" a surface acoustic wave device is disclosed having a substrate tapered to a tip at one end. A fan-shaped interdigital electrode structure having curved fingers is formed on the tip thereof. In the record mode the stylus is brought into contact with a master substrate and power is applied to the interdigital electrode. A deformation of the surface of the master substrate representative of the information is effected by the stylus tip during the recording operation.

The most widely used transducer for surface acoustic wave (SAW) devices is the interdigital transducer. In the Tosima patent the interdigital transducer is fan-shaped to focus SAW at the tip of the stylus when the cutting is being effected. The interdigital transducer is characterized by an electrode having two conductors. Each conductor includes a plurality of electrode fingers that are interdigitized to form pairs of interlocking conductors. The spacing between successive fingers of the electrode may be equal to one-quarter of the wavelength of the SAW to be excited and the center-to-center spacing of successive fingers may be made equal to one-half of the wavelength.

The interdigital transducer structure has several disadvantages for use in SAW generation. For example, interdigital transducers are bidirectional. In general, half of the applied SAW power is propagated in one direction while the other half is propagated in the opposite direction. For recording operations the bidirectional wave excitation may affect the power that can be concentrated at the stylus tip for cutting.

Another disadvantage of the interdigital transducer is that the SAW device having such a transducer is generally restricted to narrow frequency band operation. The bandwidth of the device is limited by the transducer geometry when reflections from intermediate electrode pairs interact with the input signal. In some applications wideband operation can be obtained by using a limited number of finger pairs for the transducer; however, the power generated by a SAW device having a limited number of fingers is reduced because the power generated is proportional to the square of the number of electrode finger pairs for a given length of finger electrodes and a given voltage applied to the fingers.

Further, interdigital transducer structures have strong SAW reflections from the electrodes of the transducer. The input impedance exhibits many peaks and valleys in the frequency response.

Another problem with an interdigital transducer is capacitive coupling. Since the voltage of every other electrode is in an in-phase condition a direct capacitive coupling occurs between the generation and reception transducers.

In accordance with the principles of the present invention a SAW device is provided which reduces or eliminates the aforesaid problems of the prior art. The improved device is provided with a traveling wave surface acoustic wave transducer. The traveling wave transducer provides wideband operation and power characteristics which make it well suited to SAW applications.

In a journal article published for THE 6th INTERNATIONAL CONGRESS ON ACOUSTICS held in Tokoyo, Japan on Aug. 21-28, 1968, by Kimio Shibayama et al. entitled "EXCITATION OF ELASTIC SURFACE WAVES WITH WIDEBND FREQUENCY CHARACTERISTICS" in interdigital-type transducer is described for use in combination with an electromagnetic delay line. The Shibayama structure is used to broaden the frequency bandwidth of SAW devices. In the structure described by Shibayama et al. the SAW electrode is provided in an interdigitized arrangement. An active electrode which is coupled to the incoming, delayed input signal is interlocked with a ground electrode to provide an interdigitized-type transducer. In general, the Shibayama et al. structure provides wideband operation; however, the electrode width is limited because of the space occupied by the ground electrode.

In accordance with a further principle of the present invention the electrode structure is not interdigitized with a ground electrode. According to the present invention a traveling wave surface acoustic wave transducer is provided. The traveling wave transducer is not interdigitized and no interlocking ground electrode is provided. Accordingly, an electrode structure is provided that has an electrode having finger width which may be twice that of the Shibayama et al. structure. The wider electrode structure reduces the resistance of an electrode. Further, it improves the manufacturability of the device, making it easier to prepare a photomask and to deposit an electrode.

In accordance with one aspect of the present invention a surface acoustic wave device includes a support having a surface for supporting the propagation of surface acoustic waves and a traveling wave surface acoustic wave transducer. The traveling wave transducer includes a plurality of electrode fingers arranged in an array on the surface of the support. The array is provided such that each electrode finger is equally spaced from adjacent electrode fingers. A driver delay line including a plurality of taps is also provided. Each of the electrode fingers is connected to respective ones of the plurality of taps. The input end of the driver delay line is coupled to a source of signals and the termination end is coupled to a terminating impedance. The signals from the source are coupled to the electrode fingers such that a surface acoustic wave propagates along the surface of the support in substantially one direction.

In accordance with another aspect of the present invention a surface acoustic wave transducer is provided in a recording system for recording information in the form of surface variations in a record medium. The device includes a support and a traveling wave surface acoustic wave transducer. According to this aspect the traveling wave surface acoustic wave transducer has electrode fingers having an arcuate shape. A stylus is arranged on a surface of the support. The signals from the source are coupled to the arcuate electrode fingers such that a surface acoustic wave propagates along the surface of the support. The electrode fingers are formed on the surface of the support such that the surface acoustic wave launched therefrom converges substantially to a point on the surface of the support. The stylus joins the surface proximate to that point.

Other features and advantages of the invention will be more fully understood from the following detailed description of the preferred embodiment, the appended claims and the accompanying drawing in which:

Figures 1, 2:
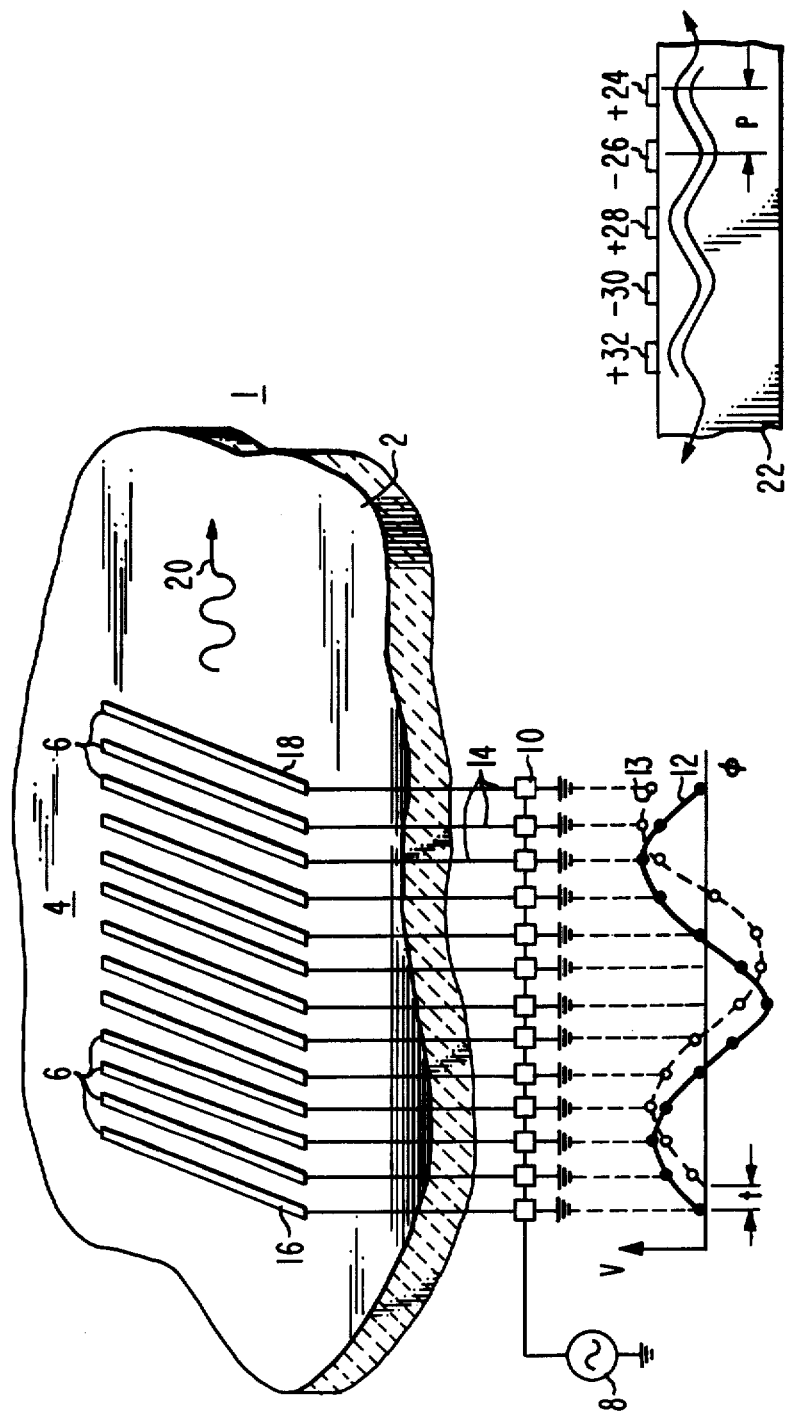
FIG. 1 is a perspective view of a portion of a surface acoustic wave device having a traveling wave-type surface acoustic wave transducer.
FIG. 2 is a side view of a portion of a SAW device showing a particular feature associated with the spacing between adjacent electrodes.

Referring to FIG. 1, a surface acoustic wave device 1 is shown. SAW device 1 comprises substrate 2 which, illustratively, may be formed of a piezoelectric material such as lithium niobate. To excite SAW on the surface of substrate 2 a multi-electrode traveling wave-type surface acoustic wave transducer 4 is used. Transducer 4 is deposited on a portion of the surface of substrate 2 by techniques well-known in the SAW arts. Transducer 4 includes a plurality of parallel line electrode fingers 6. A signal source 8 is applied along a delay line 10 having taps 14 connected to respective ones of the electrode fingers 6. The delay line and its driver will be described in more detail herein. A sinusoidal signal 12 is generated by source 8. The signal applied in each electrode finger 6 has a phase corresponding to a SAW signal traveling along the surface of the substrate 2. The sinusoidal signal is shown a short time later by curve 13. The applied signal excites a traveling wave in the form of a SAW on acoustic substrate 2.

In operation, the propagation of signal 12 in the delay line 10 is made equal to the propagation of a SAW on the piezoelectric substrate 2. The SAW propagation direction is the same as the direction that the voltage wave 12 travels down delay line 10. For example, a positive going pulse from source 8 excites a positive going SAW pulse in region 16 and, as the positive going pulse travels down delay line 10, the positive going SAW pulse is reinforced as it travels toward region 18. The SAW propagates in one direction 20 (i.e., to the right) in the same direction as the voltage wave. As the SAW propagates from region 16 to region 18 it is continuously excited and becomes stronger. On the other hand, SAW propagating in a direction opposite to direction 20 (i.e., to the left) are not effectively excited. If a wave moving opposite to the direction 20 is generated by the electrodes in region 18 it alternatively encounters constructive and destructive additions. The SAW propagation in direction 20 is arranged to encounter constructive addition only. Thus, the excited SAW moving in the direction of the voltage wave is favorably generated while the SAW moving in the opposite direction is not always favorably generated. Such a characteristic effects unidirectional operation of a traveling wave surface acoustic wave transducer. A unidirectional transducer has a lower insertion loss as compared to a bidirectional transducer such as an interdigital transducer. Unidirectionality improves the insertion loss by 3 dB. For an interdigital transducer the number of finger electrodes must be reduced to effect wideband operation. Reduction of the number of electrodes produces high insertion loss. In the traveling wave case, the number of SAW waves traveling within the transducer region is increased, and thus the insertion loss may be reduced substantially.

The mechanism for propagating SAW down the surface of substrate 2 is that the voltage difference between adjacent electrodes, or the electric field, produce a strain on the surface of the substrate. This strain is distributed periodically with the same wavelength as that of the SAW. Thus the SAW is generated down the surface of the substrate.

To excite low-frequency SAW, a low-frequency voltage is fed to the driver delay line. Such operation produces a long wavelength SAW. In principle, there is no low frequency limit for traveling wave surface acoustic wave transducers. For high frequency, however, there is a special case that must be considered. Referring to FIG. 2, a side view of a portion of a SAW device 22 is shown. Device 22 has electrode fingers 24, 26, 28, 30 and 32 having an electrode periodicity P. At high frequencies, for example, when the SAW wavelength $\lambda$ is such that the electrode periodicity is equal to $\lambda/2$, every other electrode finger has the same voltage applied. This situation is the same as that of an interdigital transducer and SAW generated by a traveling wave transducer having such a periodicity are excited bidirectionally. In this case the traveling wave acoustic wave transducer operates in the same manner as the interdigital transducer operates. At high frequency, therefore, SAW excitation from a traveling wave transducer degenerates. The high conversion loss at the frequency $f_0$, where the finger spacing is equal to half of the wavelength of the SAW generated, is not acceptable for video disc recording operations as described herein.

The conversion loss due to bidirectionality increases by one 3 dB at $f_0$, however, the loss in the external cable or delay line may be much greater. In the external cable or delay line the capacitive impedance of each electrode loads the cable or line to cause reflections. When the reflections add in-phase, i.e., constructively, the conversion loss may be very high. For this reason, a SAW device having a traveling wave-type transducer has an upper frequency limit given by the condition wherein half of the shortest wavelength SAW is equal to the finger periodicity P.

In the case of an interdigital transducer, a large number (N) of electrode finger pairs produces high conversion efficiency from electric to SAW energy but the bandwidth is narrow because the bandwidth is a function of the center frequency of the device divided by the number of electrode finger pairs. In sharp contrast, the traveling wave acoustic wave transducer is intrinsically broadband and the bandwidth does not decrease with the number of electrodes. Thus, in the case of the traveling wave transducer, both high conversion efficiency and broad bandwidth characteristics may be realized at the same time.

The reflection of SAW from another interdigital transducer causes a problem by producing ripples in the frequency response of the device. In the case of the traveling wave transducer, generally, the device is not operated at a frequency where the condition $\lambda/2$ equals P but, instead, is operated in a lower frequency region. Thus, the reflection signal from each transducer element has a constant value phase difference. Superimposing reflection signals having a constant value phase difference (e.g., the reflection signals from a traveling wave-type transducer) produces a signal that has an amplitude much less than the signal that would be produced by reflection signals which are reflecting in-phase (e.g., the reflection signals from an interdigital transducer). Interdigital transducers are designed to produce in-phase reflection. For this reason, traveling wave-type transducers have superior characteristics to the interdigital transducer.

Direct capacitive coupling occurs with a device having an interdigital transducer wherein every other electrode is connected to one common current feeding electrode. The electrode field generated in every other electrode extends across the SAW propagation medium and couples to the electrodes of the receiving interdigital transducer. In the case of a traveling wave transducer the voltage on each electrode is different in phase and each voltage couples to the receiving electrode at different phases. Thus, the receiving electrode is not affected as much in the traveling wave-type transducer device as it is in the interdigital transducer device.

A bulk shear wave is generated by an interdigital transducer. A bulk shear wave is a few percent faster in propagation velocity than a SAW. Since the propagation speed is a few percent higher for the bulk shear wave the shear mode is strongly excited at a few percent higher frequency than the frequency for maximum SAW excitation. This is effected because the periodicity or wavelength of the voltage wave cannot be altered in an interdigital transducer. On the contrary, the wavelength of the voltage wave on a traveling wave transducer is altered according to the desired operating frequency to exactly match the actual SAW wavelength. Thus, in the traveling wave transducer the voltage wave couples more strongly to the SAW than to the bulk shear wave.

Figure 3:
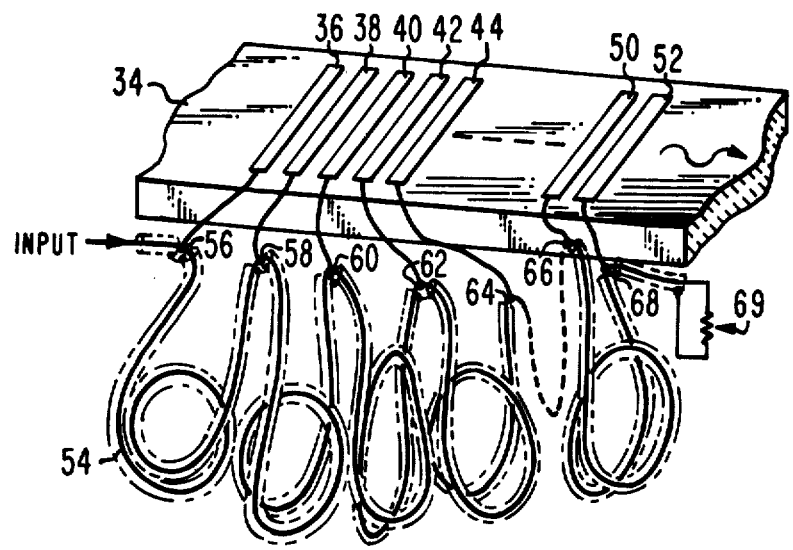
FIGS. 3, 4, 5, 6 and 7 illustrate several embodiments for a transmission delay line which may be constructed in accordance with the principles of the present invention.

A driver delay device is required to produce a traveling voltage wave whose propagation velocity is constant with frequency and is equal to the SAW propagation velocity on the piezoelectric substrate. Various embodiments of driver delay devices will be explained with reference to FIGS. 3, 4, 5, 6 and 7. Referring to FIG. 3, SAW device 34 includes electrode fingers 36, 38, 40, 42, 44, 50 and 52. A coaxial cable 54 is connected to the electrode fingers via taps 56, 58, 60, 62, 64, 66 and 68. The length of the cable between taps, for example, between taps 56 and 58, is selected so that the propagation time on the cable is equal to the SAW propagation time between corresponding electrodes, i.e., electrodes 36 and 38. The output port of the cable is terminated by a resistor 69 which is equal to the characteristic impedance of the cable so that the input signal propagates in one direction along the cable and is not reflected at the termination end.

Figure 4:
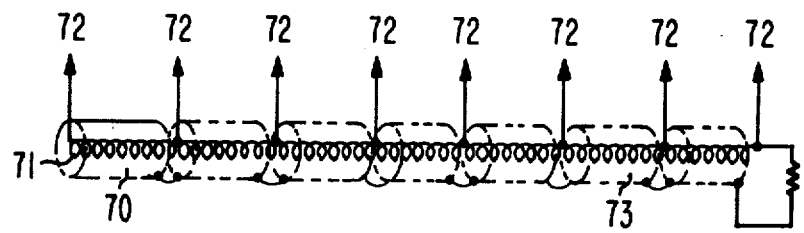
Figure 5:
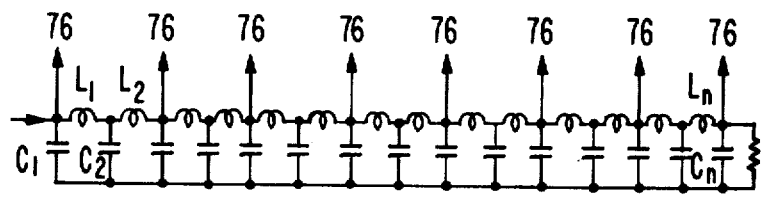

FIGS. 4 and 5 illustrate delay lines which may eliminate the use of a bulky, long coaxial cable. The delay line 70 of FIG. 4 comprises a delay cable 73 having the structure of a coiled central conductor 71. Taps 72 may be used to connect to the electrode fingers of a traveling wave surface acoustic wave transducer. Another example of a delay structure is the delay line 74 of FIG. 5. Delay line 74 comprises a plurality of inductors $L_1$, $L_2$ ... to $L_n$ and capacitors $C_1$, $C_2$, ... to $C_n$ arranged in a ladder network. Taps 76 may be connected to the electrode fingers of a traveling wave surface acoustic wave transducer. One problem with the coiled center conductor and networks of FIGS. 4 and 5 is that the delay time is slightly frequency dependent.

Figure 6:
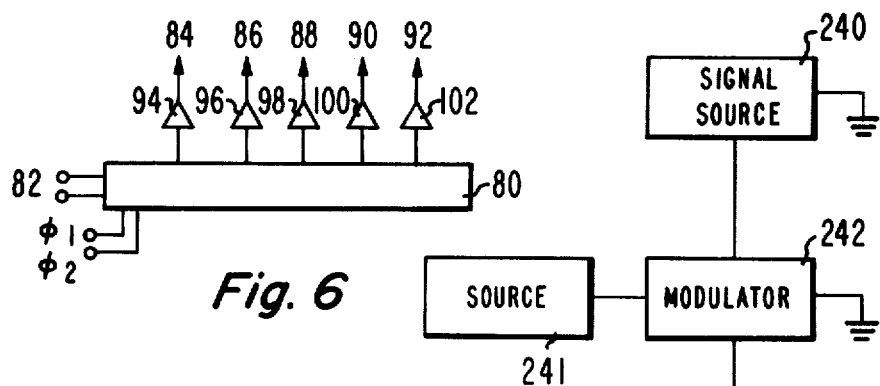

Referring to FIG. 6 another example of a driver delay device is illustrated. A charged coupled device (CCD) 80 is controlled by clock signals $\Phi_1$ and $\Phi_2$. An analogue signal fed into the input port 82 of CCD 80 appears on output taps 84, 86, 88, 90 and 92 with a predetermined delay time. An advantage of the CCD structure is that the delay is independent of the frequency of the input signal. In the case where the output signal from each tap of the CCD is not sufficient to excite SAW of the required power, amplifiers 94, 96, 98, 100 and 102 may be used to amplify the signals to the tap output ports.

Figure 7:
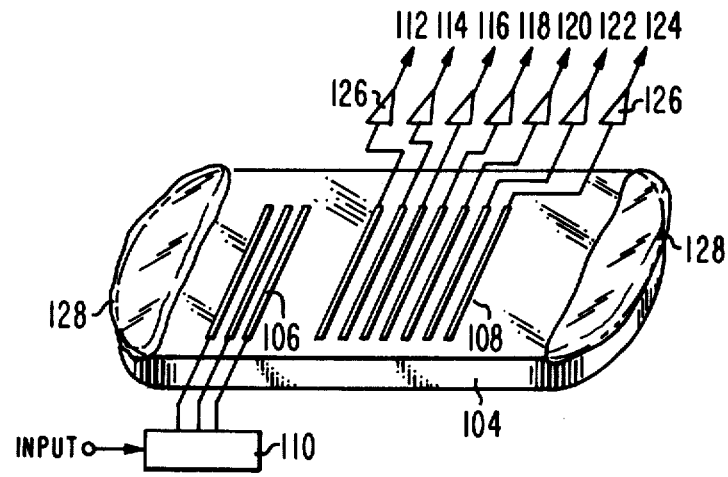

Referring to FIG. 7 a further example of a driver delay device is shown. A SAW exciter 104 includes a generation transducer 106 and a reception transducer 108. An input signal is applied through a driver delay line 110 (the input signal could be directly coupled to a conventional interdigital transducer) to the generation transducer 106. The delayed output from each tap output 112, 114, 116, 118, 120, 122 and 124 of reception transducer 108 is amplified by amplifiers 126 and delivered to the input of another SAW having a traveling wave-type transducer. SAW exciter 104 has absorbtive material 128 positioned on each and of the device to reduce spurious signals caused by reflections. Illustratively, absorbtive material 128 may be metal or oxide powder cemented by epoxy resin.

Figure 8:
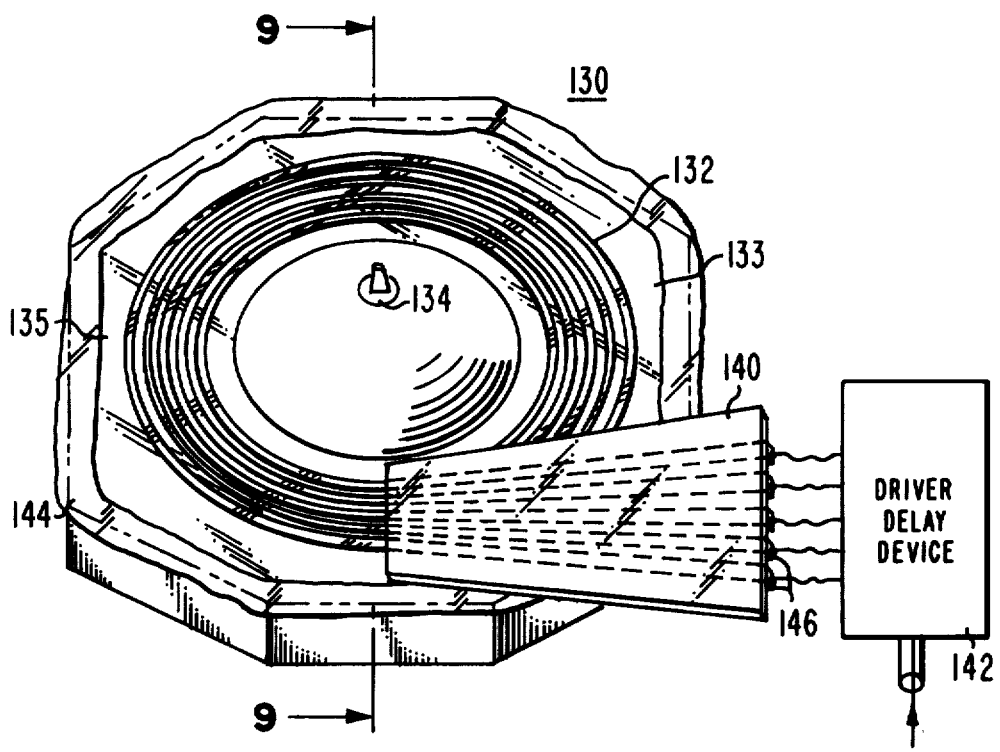
FIGS. 8 and 9 show perspective and cross sectional views respectively of a SAW recording device exhibiting a construction in accordance with the principles of the present invention.
Figure 9:
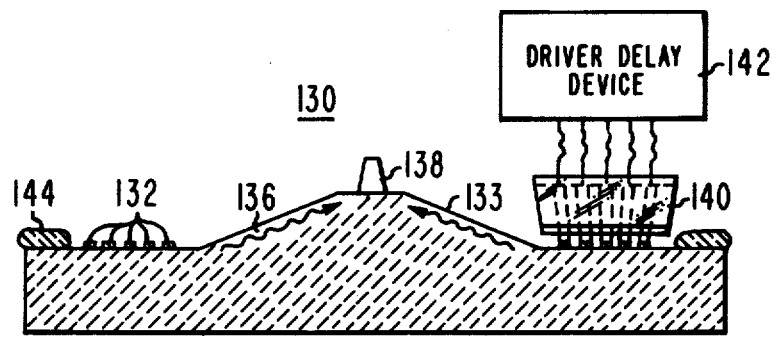

An explanation of the operation of a traveling wave surface acoustic wave transducer SAW device for cutting video and audio signals will now be explained with reference to FIGS. 8 and 9. SAW launched from a semi-circular traveling wave surface acoustic wave transducer 132 deposited on the surface 133 of substrate 135 of device 130 are concentrated at apex 134 of a cone-shaped region 136 on substrate 135. The high energy density concentrated at apex 134 produces high vibrational amplitude and vibrates stylus 138. Illustratively, stylus 138 may be of a type described in U.S. Pat. No. 4,035,590, issued on July 12, 1977, to J. B. Halter, entitled "APPARATUS FOR ELECTROMECHANICAL RECORDING OF SHORTWAVE LENGTH MODULATION IN A METAL MASTER".

To concentrate SAW at the apex 134 traveling wave transducer 132 should be circular in shape for an isotropic piezoelectric substrate. For non-uniform or anisotropic substrates, however, the transducer shape may have to be modified in accordance with the teachings described in a U.S. patent application filed concurrently herewith for M. Toda entitled "SURFACE ACOUSTIC WAVE CUTTERHEAD FOR RECORDING HAVING A CIRCULAR TRANSDUCER".

A flexible carrier 140 may be provided to couple the driver delay device 142 to the traveling wave surface acoustic wave transducer 132. Printed conductors 146 are formed on one surface of the flexible carrier 140. A SAW absorber 144 may be provided on the edge of device 130 to absorb any spurious signals.

Figure 10:
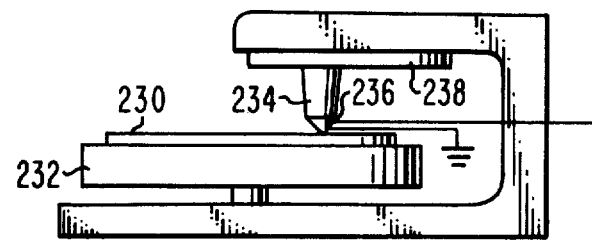
FIG. 10 is a representation, partially in block diagram form, of a SAW recording apparatus suitable for use in formation of an information record.

An explanation of the operation of a SAW device to cut undulations into a master substrate surface for use in video discs will now be provided with reference to FIG. 10. A master substrate 230 (illustratively, of copper) is placed on movable support 232 (i.e., turntable) in operating relationship with SAW cutterhead 236. SAW cutterhead 236 may be of a type described with reference to FIGS. 8 and 9. In this arrangement the support base of SAW cutterhead 236 may be attached to pedestal 234. The cutting stylus positioned on the end of cutterhead 236 is positioned with respect to master 230 in order to cut a groove having a quiescent groove depth of less than one micrometer while relative motion is established between substrate 230 and cutterhead 236. In one preferred arrangement, pedestal 234 is moved linearly on slide 238 while turntable 232 is rotated such that cutterhead 236 cuts a spiral groove in a disc-shaped substrate 230.

Video signals (along with accompanying audio signals) from a source 240 are applied via modulator 242 to cutterhead 236 to effect short wavelength modulation of the groove depth having a peak-to-peak displacement of less than the groove depth. Modulator 242 is supplied with a continuous wave signal of approximately 5 MHz from source 241. The video signal modulates the carrier supplied from source 241. In the record mode the power applied to cutterhead 236 is sufficient to effect a modulation of the groove depth representative of the information to be recorded.

After recording, the master substrate 230 has a relief pattern corresponding to that which is desired in the final record. Stampers which are used to produce production line records are made from the substrate and a vinyl record having the desired relief pattern for consumer use is formed from the stamper.

It will be understood by those of skill in the art that other arrangements for the electrode structure or the shape of the stylus tip for use in recording video signals are possible. For example, in a patent application filed concurrently herewith for S. Tosima et al. entitled, "A SURFACE ACOUSTIC WAVE DEVICE FOR RECORDING VIDEO INFORMATION ON A SUBSTRATE HAVING A PYRAMID SHAPE" a tip structure of a pyramidal-shape is disclosed. In the Tosima application a plurality of transducers are formed on the triangular surfaces of a pyramidal-shaped structure surface acoustic waves launched from the transducer are forces at the apex of the pyramid. Vibratory motion of a stylus positioned at the apex is effected by the acoustic waves. In accordance with another arrangement described in an application filed concurrently herewith for M. Toda entitled, "SURFACE ACOUSTIC WAVE CUTTERHEAD FOR DISC RECORDING HAVING A CIRCULAR TRANSDUCER," a plurality of transducers having varied finger electrode periodicity or having a plurality of finger number pairs is used. Since the periodicity of each transducer corresponds to a different center frequency, a plurality of transducers with overlapping main lobes provides a wide frequency response. When electrode pairs of different pair numbers are combined in a parallel arrangement the large conversion loss at certain frequencies is reduced for the overall structure.

What is claimed is:

1. A surface acoustic wave device comprising:
   a support having a surface for supporting the propagation of surface acoustic waves;
   a traveling wave surface acoustic wave transducer including a plurality of electrode fingers arranged in an array on said surface of said support, said array being provided such that each electrode finger is equally spaced from adjacent electrode fingers, said spacing effecting a periodicity, P; and
   a driver delay line including a plurality of taps, each of said electrode fingers being connected to respective ones of said plurality of taps, said driver delay line having an input end coupled to a source of signals and a termination end;
   said signals from said source being coupled to said electrode fingers such that a surface acoustic wave propagates along said surface of said support in substantially one direction.

2. The surface acoustic wave device according to claim 1 wherein the periodicity of said electrode fingers is greater than one-half of the wavelength of a surface acoustic wave generated at the highest signal frequency of the source of signals.

3. The surface acoustic wave device according to claim 2 wherein said terminating end is coupled to a terminating impedance equal to the characteristic impedance of the driver delay line.

4. The surface acoustic wave device according to claim 3 wherein said driver delay line comprises a tapped coaxial cable.

5. The surface acoustic wave device according to claim 3 wherein said driver delay line comprises a delay cable having a coiled center conductor.

6. The surface acoustic wave device according to claim 3 wherein said driver delay line comprises a ladder network including a succession of series and shunt impedances.

7. The surface acoustic wave device according to claim 2 wherein said driver delay line comprises a charge coupled device.

8. The surface acoustic wave device according to claim 2 wherein said driver delay line comprises a surface acoustic wave apparatus.

9. In a record system for recording information in the form of surface variations in a record medium, a surface acoustic wave device comprising:
 a support having a surface for supporting the propagation of surface acoustic waves;
 a traveling wave surface acoustic wave transducer including a plurality of electrode fingers arranged in an array on said surface of said support, said array being provided such that each electrode finger is equally spaced from adjacent electrode fingers, said spacing effecting a periodicity, P; and
 a driver delay line including a plurality of taps, each of said electrode fingers being connected to respective ones of said plurality of taps, said driver delay line having an input end coupled to a source of signals and a terminating end; and
 a stylus joining said surface of said support;
 said signals from said source being coupled to said electrode fingers such that a surface acoustic wave propagates along said surface of said support, said electrode fingers being formed on said surface of said support such that said surface acoustic waves launched therefrom converge substantially to a point on said surface of said support, said stylus joining said surface proximate to said point.

10. The surface acoustic wave device according to claim 9 wherein the periodicity of said electrode fingers is greater than one-half of the wavelength of a surface acoustic wave generated at the highest signal frequency of the source of signals.

11. The surface acoustic wave device according t claim 10 wherein said terminating end is coupled to a terminating impedance equal to the characteristic impedance of the driver delay line.

12. The surface acoustic wave device according to claim 11 wherein said driver delay line comprises a tapped coaxial cable.

13. The surface acoustic wave device according to claim 11 wherein said driver delay line comprises a delay cable having a coiled center conductor.

14. The surface acoustic wave device according to claim 11 wherein said driver delay line comprises a ladder network including a succession of series and shunt impedances.

15. The surface acoustic wave device according to claim 10 wherein said driver delay line comprises a charge coupled device.

16. The surface acoustic wave device according to claim 10 wherein said driver delay line comprises a surface acoustic wave apparatus.

17. The surface acoustic wave device according to claim 9 wherein each of said electrode fingers are arcuate in shape.

18. The surface acoustic wave device according to claim 17 wherein the periodicity of said electrode fingers is greater than one-half of the wavelength of a surface acoustic wave generated at the highest signal frequency of the source of signals.

19. The surface acoustic wave device according to claim 18 wherein said terminating end is coupled to a terminating impedance equal to the characteristic impedance of the driver delay line.

20. The surface acoustic wave device according to claim 19 wherein said driver delay line comprises a tapped coaxial cable.

21. The surface acoustic wave device according to claim 19 wherein said driver delay line comprises a delay cable having a coiled center conductor.

22. The surface acoustic wave device according to claim 19 wherein said driver delay line comprises a ladder network including a succession of series and shunt impedances.

23. The surface acoustic wave device according to claim 18 wherein said driver delay line comprises a charge coupled device.

24. The surface acoustic wave device according to claim 18 wherein said driver delay line comprises a surface acoustic wave apparatus.

25. The surface acoustic wave device according to claim 18 wherein said arcuate shaped electrode fingers are substantially circular in shape.

* * * * *

UNITED STATES PATENT AND TRADEMARK OFFICE
CERTIFICATE OF CORRECTION

PATENT NO. :    4,434,481
DATED      :    February 28, 1984
INVENTOR(S):    Minoru Toda et al.

It is certified that error appears in the above-identified patent and that said Letters Patent is hereby corrected as shown below:

Col. 2, line 58    "WIDEBND"    should be -- WIDEBAND --

Col. 7, line 8     "and"        should be -- end --

Col. 8, line 21    "forces"     should be -- focused --

Col. 9, line 45, Claim 11

"t" should be -- to --

Signed and Sealed this

Twenty-fourth Day of April 1984

[SEAL]

Attest:

GERALD J. MOSSINGHOFF

Attesting Officer    Commissioner of Patents and Trademarks